March 23, 1965

M. C. JONES, JR 3,174,612

TRANSFER APPARATUS

Filed Feb. 6, 1963

INVENTOR.
MORRIS C. JONES, JR.
BY

ATTORNEYS

INVENTOR.
MORRIS C. JONES, JR.

March 23, 1965 M. C. JONES, JR 3,174,612
TRANSFER APPARATUS

Filed Feb. 6, 1963 3 Sheets-Sheet 3

INVENTOR.
MORRIS C. JONES, JR.
BY
Learman, Learman McCulloch
ATTORNEYS

United States Patent Office 3,174,612
Patented Mar. 23, 1965

3,174,612
TRANSFER APPARATUS
Morris C. Jones, Jr., Saginaw, Mich., assignor to Baker Perkins Inc., Saginaw, Mich., a corporation of New York
Filed Feb. 6, 1963, Ser. No. 256,611
6 Claims. (Cl. 198—20)

This invention relates to apparatus and methods for transferring articles from one movable conveyor to another movable conveyor and more particularly to such methods and apparatus having especial applicability to automated bakeries.

In the designing and equipping of large capacity, commercial bakeries it is customary to provide automatic materials handling equipment capable of transporting a bakery product throughout its forming and baking cycles without necessitating attendance by an operator. In some instances it is necessary to transfer the bakery products from a generally horizontal conveyor to a vertically movable conveyor run in timed relation to the movement of the vertical conveyor run. One such instance usually occurs at the front of an oven of the kind utilizing endless conveyors on which are supported swing trays that move in a continuous path through the oven between loading and discharge stations. In such ovens it is common practice to arrange the tray conveyors in such a manner that they move vertically at opposite ends of the oven, and to provide loading and unloading means adjacent one of the vertical runs for transferring baked products to and from the vertical run at the loading and unloading stations respectively. The operations of loading and unloading mechanisms for use with vertically movable trays necessarily must be timed to the arrival of successive trays at the loading and unloading stations.

When transferring dough products from a proofer to an oven, the movements imparted to pans containing the proofed dough must be sufficiently gentle to avoid the collapse of the raised dough. However, the pans must be accelerated to a speed sufficient to enable them to be deposited on a high speed oven tray without necessitating stopping of the tray conveyor.

Another object of the invention is to provide an article transfer conveyor having article propelling means and drive means therefor wherein the drive means are compactly mounted in position below the conveyor so as to avoid interference with other apparatus and to minimize the risk of injury to workmen.

Another object of the invention is to provide apparatus of the kind referred to having means for moving articles toward a vertical conveyor run and including additional means operable to propel the articles toward the vertical conveyor at a speed faster than the conveyor on which the articles are supported.

Another object of the invention is to provide apparatus for accelerating the speed of an article to be transferred after it once has been set in motion.

A further object of the invention is to provide article propelling means usable in conjunction with a driven conveyor and in which the propelling means is shifted between active and inactive positions without interfering with other articles on the conveyor or with articles that have been transferred from the conveyor.

Other objects and advantages of the invention will be pointed out specifically or will become apparent from the following description when it is considered in conjunction with the appended claims and the accompanying drawings, in which:

Figure 1:
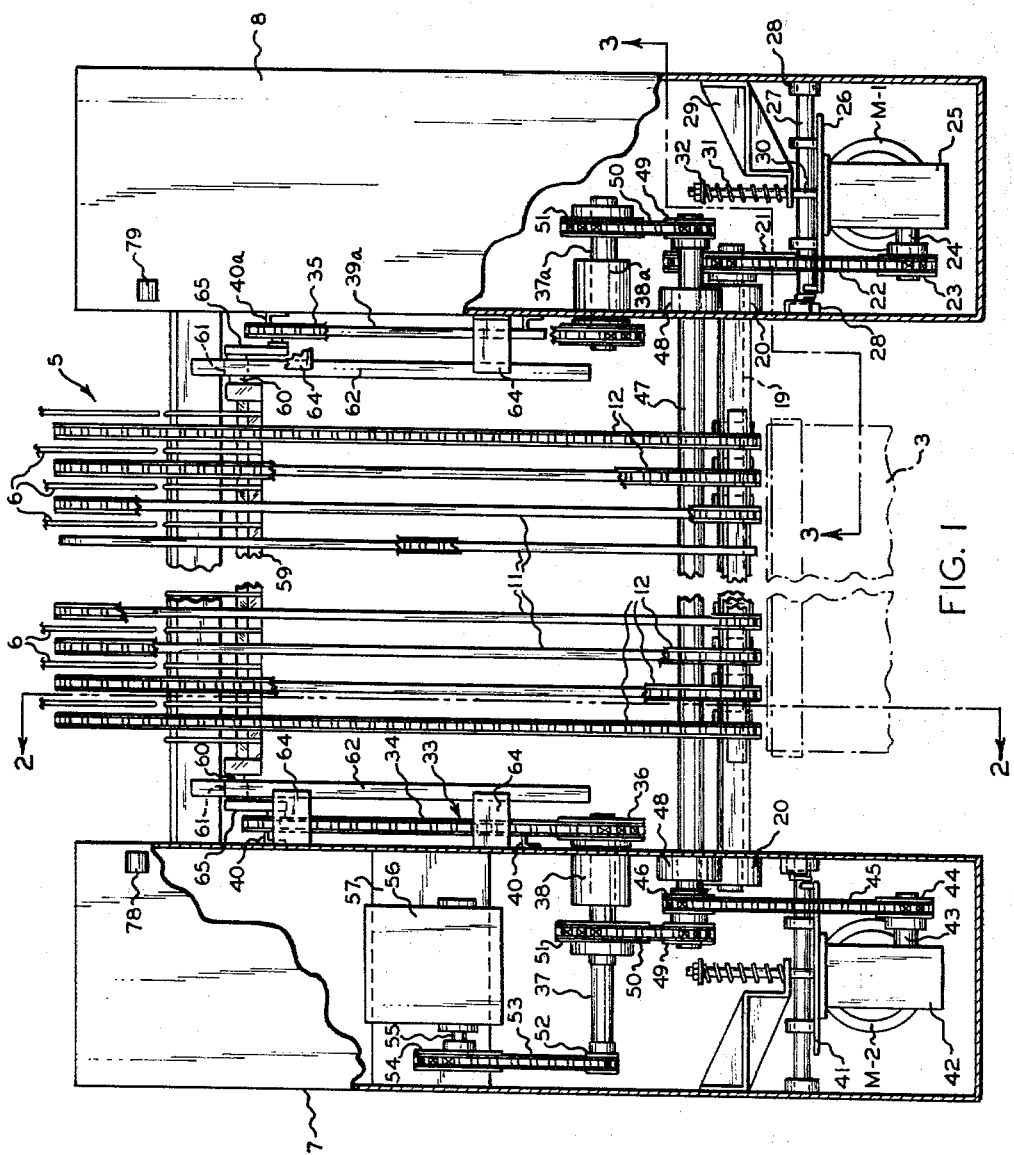
FIGURE 1 is a fragmentary, partly sectional and partly plan view of transfer apparatus constructed in accordance with the invention and located in a position between a bakery proofer and an oven.

Transfer apparatus constructed in accordance with the disclosed embodiment of the invention is illustrated as being interposed between a proofer 1 and an oven 2 for transferring sets of pans P from the proofer to the oven. The proofer 1 includes a driven, endless conveyor 3 by means of which the sets of pans P are discharged from the proofer at the end of a proofing cycle. The oven includes parallel, endless conveyor chains 4 on which are supported swing trays 5, each tray comprising a plurality of parallel, spaced apart rods or tines 6 on which the sets of pans may be supported. The conveyor chains 4 are so arranged that at the loading end of the oven they have a substantially vertical run and are driven in such a direction that successive trays 5 move upwardly past the loading station.

The transfer apparatus, which may be portable, comprises a pair of frame members 7 and 8 which are spanned by transverse members 9 and 10 which support a plurality of laterally spaced apart guide shoes 11, around each of which is trained an endless conveyor chain 12. The chains 12 are supported on the shoes 11 so as to provide a generally horizontal supporting surface that is movable forwardly from the proofer to the oven. The forward end of each shoe 11 is provided with a nosepiece 13 around which the associated chain is trained.

Fixed to the support 9 is a plurality of brackets 14, on each of which is pivoted an arm 15 having a sprocket wheel 16 journaled at one end thereof and around which the associated chain 12 is trained. The opposite end of the arm 15 engages an adjusting screw 17 which may be manipulated to rock the arm 15 so as to permit the tension on the chain to be adjusted. From the sprocket wheel 16, each chain is trained around a sprocket 18 which is fast on a shaft 19. The shaft 19 spans the frame members 7 and 8 and is journaled in bearings 20 supported thereby. To one end of the shaft is fixed a sprocket 21 around which is trained a chain 22, the chain 22 also being trained around a sprocket 23 fixed on the shaft 24 of a speed reducing unit 25 of known construction which, in turn, is driven by an electric motor M–1.

The motor M–1 and the speed reducer 25 are supported on a rockable arm 26 which is pivoted on a shaft 27 that is supported in blocks 28 mounted on the frame member 8. A bracket 29 also is fixed to the frame member 8 and slideably supports an adjusting rod 30 that extends through an opening in the bracket and engages the arm 26. A spring 31 reacts between the bracket 29 and a washer 32 at the other end of the rod to counterbalance the motor and the speed reducer 25 and avoid the imposition of undue strains on the drive chain 22.

Figure 2:
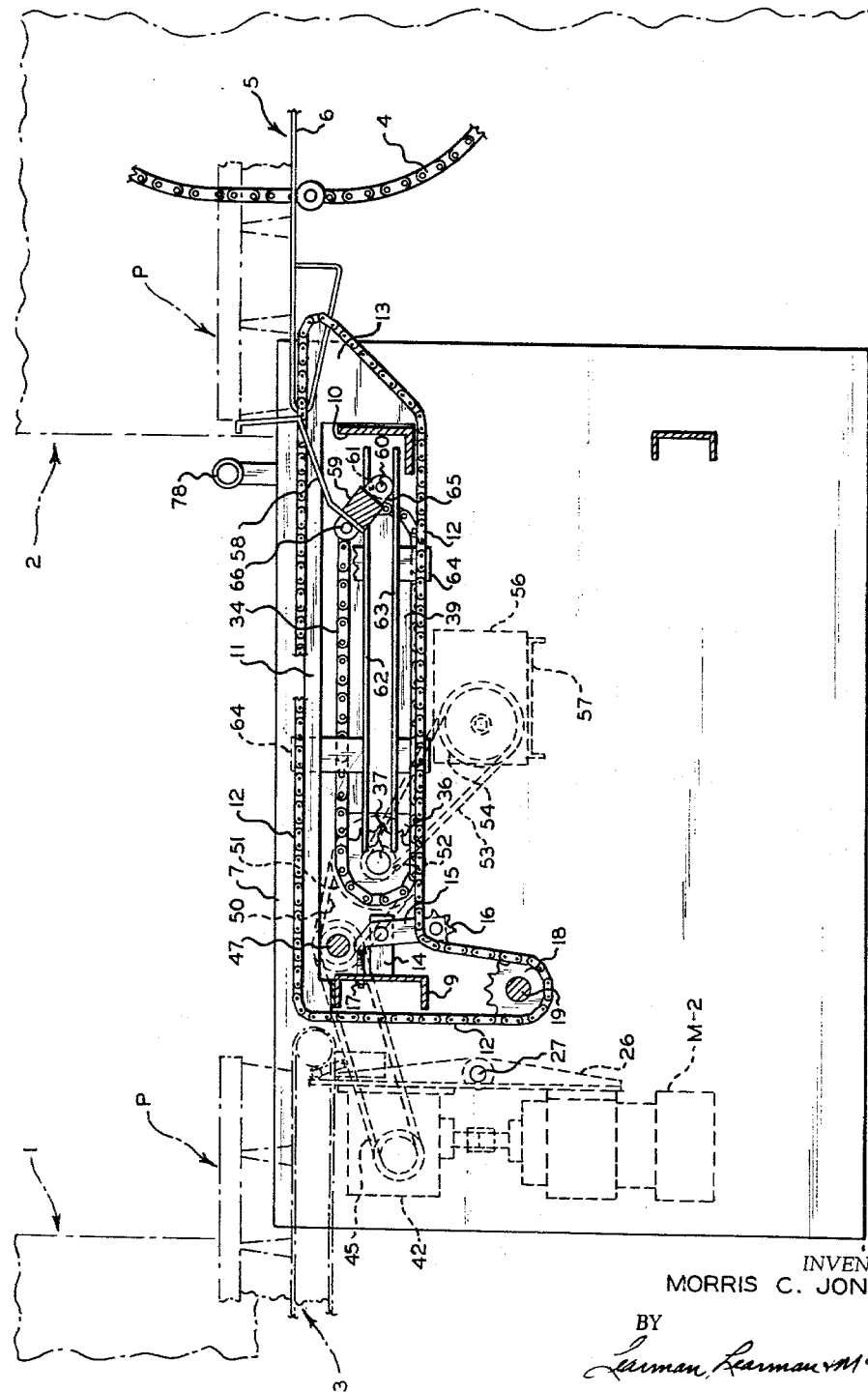
FIGURE 2 is a longitudinal sectional view taken on the line 2—2 of FIGURE 1.

As is indicated in FIGURES 1 and 2, the forward ends of the conveyor chains 12 extend between the tines 6 of the oven trays 5 so as to be capable of permitting the transfer of pans from the conveyor chains 12 to the trays 5 without interfering with the vertical movements of the trays.

The transfer apparatus includes propelling means designated generally by the reference character 33 operable to engage pans on the transverse conveyors 12 and propel them toward the oven. The propelling means comprises a pair of endless chains 34 and 35 located between the frame members 7 and 8 and extending fore and aft of the latter. At its rear end, the chain 34 is trained around a sprocket wheel 36 which is fast on a shaft 37 that is journaled in a bearing 38 supported on the frame member 7. The upper run of the chain 34 rides upon a shoe 39 which is mounted by brackets 40 on the frame 7, and the width of the shoe preferably corresponds substantially to the diameter of the sprocket wheel 36 so as to avoid vertical deflection of the upper and lower runs of the chain 34. The forward end of the shoe 39 is rounded so as to form a nose piece around which the chain is trained.

Means for mounting the chain 35 is similar to the mounting means for the chain 34 and corresponding parts are identified by corresponding reference characters, followed by the suffix a.

Means is provided for driving the propelling means 33 and comprises an electric motor M-2 that is mounted on an arm 41 similar to the arm 26. The armature shaft of the motor M-2 is connected to the input shaft of a speed reducer unit 42. The driven or output shaft 43 of the speed reducer is keyed to a sprocket wheel 44 around which is trained a drive chain 45. The chain 45 also is trained around a sprocket wheel 46 that is fast on a shaft 47 which spans the frame members 7 and 8 and is journaled for rotation in bearings 48. At its opposite ends the shaft 47 has keyed thereto sprocket wheels 49 around each of which is trained a chain 50, the chains also being trained around sprocket wheels 51 that are keyed to the shafts 37 and 37a. The arrangement is such that operation of the motor M-2 effects conjoint rotation of the shafts 37, 37a and driving of both chains 34 and 35 at the same speed.

The shaft 37 also has fixed thereto a sprocket wheel 52 and around which is trained a chain 53. The chain 53 also is trained around a sprocket wheel 54 that is fast on a shaft 55 extending into a housing 56 which is supported on a frame member 57 and within which is mounted a plurality of electrical switches that are adapted to be operated in usual manner by a series of cams mounted on the shaft 55. The switches, the cams, and their operation will be explained hereinafter.

The article propelling means includes a plurality of pan engaging or pusher fingers 58 all of which are secured at corresponding ends to a bar 59 that extends transversely of the path of forward movement of the chains 12. At opposite ends of the bar 59 are stub shafts 60 on each of which is journaled a guide roller 61 which is received between a pair of vertically spaced, linear guide bars 62, 63 that are supported on the frame members 7 and 8 by brackets 64. Fixed to the terminal ends of each of the shafts 60 is one end of a crank arm 65, the other end of which rotatably journals a pin 66 which conveniently may constitute the pivotal connection between two adjacent links of the associated chain 34 or 35 so as rockably to mount the pan engaging fingers 58 on the drive chains 34 and 35.

Figure 4:
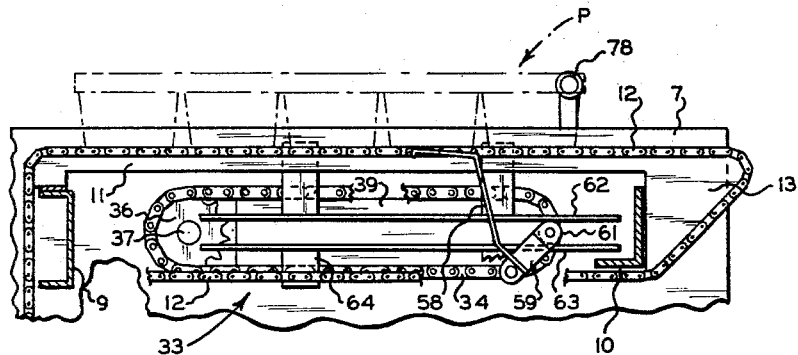
FIGURE 4 is a fragmentary, side elevational, partly sectional view of a portion of the apparatus shown in FIGURE 2.
Figure 3:
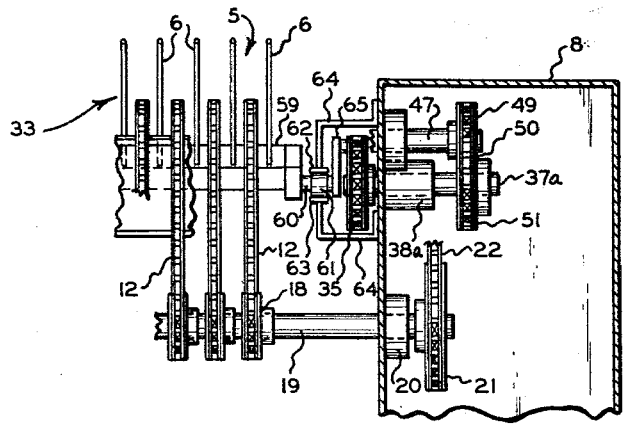
FIGURE 3 is a fragmentary sectional view taken on the line 3—3 of FIGURE 1.

As is best illustrated in FIGURES 2 and 4, the drive chains 34 and 35 of the propelling apparatus are mounted in such position that the upper runs of the drive chains substantially parallel the upper runs of the chains 12, but are spaced below the latter. Moreover, the upper and lower runs of the chains 34 and 35 are parallel to one another, and the guide rails 62, 63 are supported at a level between the upper and lower runs of the chains 34, 35. The drive chains 34, 35 are not coextensive in length with the upper runs of the chains 12, but terminate short of the ends thereof. The significance of these characteristics of the invention will be pointed out hereinafter.

When the apparatus is conditioned for operation, a set of pans P will be delivered from the discharge end of the proofer conveyor 3 to the transfer conveyor 12. The conveyor 12 will be stationary and the propelling conveyor chains 34 and 35 also will be stationary, with the pan engaging fingers 58 in a position below the level of the upper runs of the chain 12. The motor driving the oven conveyor chains 4, however, will be operating so as to cause one of the trays 5 to approach the loading zone.

Figure 5:
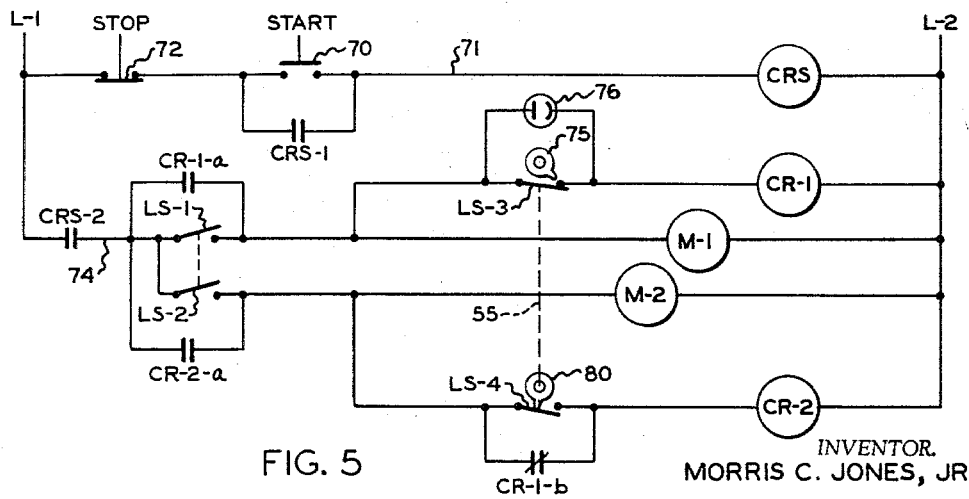
FIGURE 5 is a schematic diagram of a simplified electrical control system.

The transfer apparatus is conditioned for operation by closing a normally open starting switch 70 (see FIGURE 5) that is mounted in a line 71 which bridges two power lines L-1 and L-2 that may be connected to a suitable source of electric energy. The line 71 also contains a normally closed stop switch 72 and a starting relay CRS having first normally open contacts CRS-1 that bridge the terminals of the starting switch 70 and second normally open contacts CRS-2 mounted in a line 74. Both of the normally open contacts are closed upon energization of the relay CRS and will remain closed until the stop switch 72 is opened.

The line 74 leads through the contacts CRS-2 to a pair of ganged switches LS-1 and LS-2, both of which are mounted on the oven 2 adjacent the oven loading station for actuation by a tray 5 approaching the loading station.

Engagement of the switches LS-1 and LS-2 by a moving tray causes momentary closing of the switches. Closing of the switch LS-1 causes energization of a relay CR-1 through a normally closed switch LS-3 which is mounted in the housing 56 adjacent a cam 75 which is mounted for rotation on the shaft 55. The cam 75 is capable of opening the switch LS-3, but at the initiation of each cycle of operation, the cam is in such position as to permit the swtich to be in its closed position. The switch LS-3 is bridged by a photoelectric cell 76 including a light source 77 and a receiver 78. The purpose and operation of the cell 76 will be explained hereinafter.

Energization of the relay CR-1 effects closing of normally open contacts CR-1-a that bridged the switch LS-1 so as to permit opening of the switch LS-1 without deenergization of the relay.

Closing of the switch LS-2 by a tray 5 energizes the motor M-2 simultaneously with the energization of the motor M-1 so that the conveyor chains 12, 34 and 35 start simultaneously. Driving of the motor M-2 also effects driving of the cam shaft 55 so as to begin rotation of the cam 75 and conjoint rotation of a second cam 80 mounted on the shaft 55 and operable to effect closing of a switch LS-4, that at this time, is held open by the cam 80. The switch LS-4 is bridged by normally closed contacts CR-1-b of the relay CR-1, thereby enabling energization of a relay CR-2 simultaneously with the closing of the switches LS-1 and LS-2, even though the switch LS-4 is open. The relay CR-2 includes normally open contacts CR-2-a that bridge the switch LS-2 and which are closed upon energization of the relay CR-2 so as to maintain a circuit to the motor M-2.

Upon energization of the motors M-1 and M-2, a set of pans transferred to the conveyors 12 by the proofer conveyor 3 will be set in motion so as to be driven toward the oven loading station. Simultaneously, the propelling chains 34 and 35 will be driven so as to cause the finger mounting bar 59 to be transferred from the lower runs of the chains 34 and 35 to the upper runs thereof, whereupon the crank arms 65 will be rocked to project the fingers 58 between adjacent chains 12 to a position above the level thereof so as to be capable of engaging the rear edges of the pans P.

The motor M-2 operates at a faster speed than does the motor M-1 thereby enabling the propelling fingers 58 to overtake and engage the pans, and propel them toward the approaching oven tray 5 at a speed faster than the speed of operation of the transfer conveyors 12. For example, the speed of travel of the fingers 58 may be twice the speed of travel of the conveyors 12. Since the transfer conveyors and the propelling means begin operation simultaneously, and since the fingers 58 must be moved from a retracted position to a projected position, engagement between the fingers 58 and the pans P does not take place until after the pans have been set in motion by the transfer conveyor. Consequently, the acceleration of the pans by the propelling means does not subject the dough contained within the pans to any severe shock.

Driving movements of the conveyors 12 and the pan engaging fingers continue in a forward direction so that, as the leading set of pans P is transferred to a tray 5, a trailing set of pans may be introduced to the rear ends of the transfer conveyors 12. As the finger mounting shaft 59 reaches the forward end of the upper runs of the chains 34 and 35, the pivot pins 66 will be moved downwardly, but the rollers 61 will be maintained at the same level inasmuch as they are trapped between the guide rails 62 and 63. Consequently, downward movement of the pivot pins 66 effects rocking of the crank arms 65 and the fingers 58 in a counterclockwise direction, as is viewed in FIGURE 2, so as to effect disengagement between the fingers 58 and the leading set of pans P. The counterclockise disengaging movement imparted to the fingers 58 makes it possible to disengage the fingers and the pans without the necessity of the fingers having to enter the spaces between adjacent tines 6 of the tray. Thus the forward ends of the chains 34 and 35 should terminate short of the forward ends of the chains 12. Moreover, such disengaging movement of the fingers avoids any risk of tipping of the pan, or lid, during disengagement of the fingers and the pans.

Further driving movement of the propelling chains 34 and 35 causes the pivot pins 66 to move to the lower run of the chains, thereby fully retracting the fingers 58 to a position below the level of the upper runs of the chains 12. This movement of the fingers occurs at the forward ends of the conveyor chains 12 so as to avoid engagement between the fingers and oncoming set of pans P during rearward movement of the fingers.

As the pan engaging fingers move clear of the path of the oncoming set of pans P, the cam shaft 55 ordinarily will have been rotated such an amount as to cause the cam 75 to engage and open the switch LS–3, thereby deenergizing the relay CR–1 and opening the contact CR–1–a, so as to stop the motor M–1. However, it is preferred to permit the motor M–1 to operate until such time as a set of pans is located in a desired position on the transfer conveyor 12. This location may be determined by placement of the photoelectric cell parts 77 and 78 on the frame members 7 and 8, respectively, adjacent the forward end of the conveyor 12 and at such level as to cause a pan to interrupt the light beam and break the circuit to the relay CR–1 when the forward end of the pan arrives at the zone of the photoelectric cell. Thus, the pans may be moved forwardly even though the switch LS–3 may be opened by the cam 75. The motor M–2 operates for one complete cycle or until such time as the cam shaft 55 has rotated an amount sufficient to cause the cam 80 to engage and open the switch LS–4, at which time the relay CR–2 is deenergized and the contact CR–2–a is opened, thereby breaking the circuit to the motor M–2. The operation of the motor M–2 moves the pan engaging fingers to a position near the rear ends of the lower runs of the propelling chains so as to locate the fingers in a position to effect their prompt engagement with a set of pans upon another cycle of operation. The operation of the motor M–2 also effects closing of the switch LS–3 so as to condition the electrical apparatus for operation upon reclosing of the switches LS–1 and LS–2.

The disclosure is intended to be representative of the preferred apparatus and method, but is intended to be illustrative rather than definitive thereof. The invention is defined in the claims.

What is claimed is:

1. Transfer apparatus for use with an article support having a substantially planar surface, said apparatus comprising an endless driven member movable in an orbital path having substantially parallel, spaced apart forward and return runs; means mounting said endless member adjacent said surface with said forward run substantially parallel to said surface; article engaging means; means rockably mounting said article engaging means on said endless member for movement therewith and for rocking movements relatively thereto; linear guide means mounted substantially parallel to said forward and rearward runs of said endless means; guide means on said article engaging means confined by said linear guide means to reciprocating movement and operable to rock said article engaging means from one side of said surface to the other as the mounting means for said engaging means moves in said path from one of said runs to the other; and means for driving said endless member.

2. Apparatus as set forth in claim 1 wherein said linear guide means is mounted between said forward and return runs.

3. Transfer apparatus for use with an article support having a substantially horizontal surface, said apparatus comprising an endless driven member movable in an orbital path having substantially parallel, spaced apart forward and return runs; means mounting said endless member adjacent said surface with said forward run substantially parallel to and at a level below said surface; article engaging means; mounting means movable in said path and rockably mounting said engaging means on said endless member for movement therewith and for rocking movements relatively thereto to positions above and below said surface; linear guide means mounted substantially parallel to said forward run of said endless member but at a level below the latter; guide means on said article engaging means confined by said linear guide means to reciprocating movement and operable to rock said engaging means to and from said positions in response to driving of said endless member; and means for driving said endless member.

4. Transfer apparatus comprising a plurality of spaced apart endless conveyor members having substantially horizontal runs defining an article supporting surface; means for driving said conveyor members; at least one endless member mounted beneath said surface and having an upper run spaced below and substantially parallel to said surface; means for driving said endless member in an orbital path; article engaging finger means located between two of said endless conveyors for movements therebetween; mounting means movable in said path and rockably mounting said finger means on said endless member for rocking movements of said finger means from a first position beneath said surface to a second position above said surface, and return; first guide means connected to said finger means; and second guide means supported in a position constantly to engage said first guide means and guide the latter along a reciprocating path, said first and second guide means rocking said finger means between said first and second positions in response to driving of said endless member.

5. The apparatus set forth in claim 4 including a plurality of said endless members, and wherein said article engaging finger means is rockably mounted on each of said endless members.

6. The apparatus set forth in claim 5 wherein the means rockably mounting said finger means includes a bar extending laterally of said runs of said endless members; and means pivotally connecting said bar to said endless members.

References Cited by the Examiner

UNITED STATES PATENTS

| | | | |
|---|---|---|---|
| 1,242,945 | 10/17 | Johnson | 198—102 |
| 1,951,400 | 3/34 | Dvorak | 198—170 |
| 3,101,143 | 8/63 | Valentyne | 198—24 |

ERNEST A. FALLER, *Primary Examiner*

WILLIAM B. LA BORDE, *Examiner.*